(12) United States Patent
Olander et al.

(10) Patent No.: US 9,198,361 B2
(45) Date of Patent: Dec. 1, 2015

(54) AUTOMATIC BALE FORMING CHAMBER SPEED BASED ON INCOMING CROP MASS

(71) Applicant: AGCO Corporation, Duluth, GA (US)

(72) Inventors: Brian D. Olander, Buhler, KS (US); Cedric J. Blough, Moundridge, KS (US)

(73) Assignee: AGCO Corporation, Duluth, GA (US)

( * ) Notice: Subject to any disclaimer, the term of this patent is extended or adjusted under 35 U.S.C. 154(b) by 107 days.

(21) Appl. No.: 14/108,486

(22) Filed: Dec. 17, 2013

(65) Prior Publication Data

US 2014/0165528 A1 Jun. 19, 2014

Related U.S. Application Data

(60) Provisional application No. 61/738,037, filed on Dec. 17, 2012.

(51) Int. Cl.
*A01D 39/00* (2006.01)
*A01F 15/10* (2006.01)
*A01F 15/08* (2006.01)

(52) U.S. Cl.
CPC .............. *A01F 15/106* (2013.01); *A01F 15/085* (2013.01)

(58) Field of Classification Search
CPC ... A01B 79/005; A01F 15/0833; A01F 15/07; A01F 15/0883; A01F 15/0715; A01F 15/141; A01F 15/0825; A01F 15/10; A01F 15/0816; A01F 15/08; A01F 15/106; A01F 15/085
USPC ........... 56/10.2 R, 10.2 E, 341; 100/4, 87, 88, 100/99, 142, 189, 74
See application file for complete search history.

(56) References Cited

U.S. PATENT DOCUMENTS

| | | | |
|---|---|---|---|
| 4,850,271 A | 7/1989 | White et al. | |
| 5,551,218 A | 9/1996 | Henderson et al. | |
| 5,913,801 A * | 6/1999 | Bottinger et al. | 56/10.2 R |
| 6,594,978 B2 * | 7/2003 | Viaud | 56/10.2 E |
| 6,622,455 B2 | 9/2003 | Davis et al. | |
| 6,786,143 B2 | 9/2004 | Leupe et al. | |
| 6,874,412 B1 | 4/2005 | Glaszcz et al. | |
| 7,222,566 B2 | 5/2007 | Biziorek | |
| 7,404,355 B2 * | 7/2008 | Viaud et al. | 100/4 |
| 7,490,544 B1 | 2/2009 | Bollinger et al. | |
| 7,900,556 B2 * | 3/2011 | Freeman et al. | 100/74 |
| 7,913,482 B2 | 3/2011 | Olander et al. | |
| 8,820,040 B2 * | 9/2014 | Posselius et al. | 56/341 |
| 2011/0023732 A1 | 2/2011 | Herron | |

* cited by examiner

*Primary Examiner* — Robert Pezzuto

(57) ABSTRACT

A bale forming control method comprising causing motion of one or more forming drives of a bale forming chamber of a baler; sensing an amount of the crop material before the crop material enters the bale forming chamber; and responsive to the sensed amount, adjusting a speed of forming a bale from the crop material in the bale forming chamber.

20 Claims, 7 Drawing Sheets

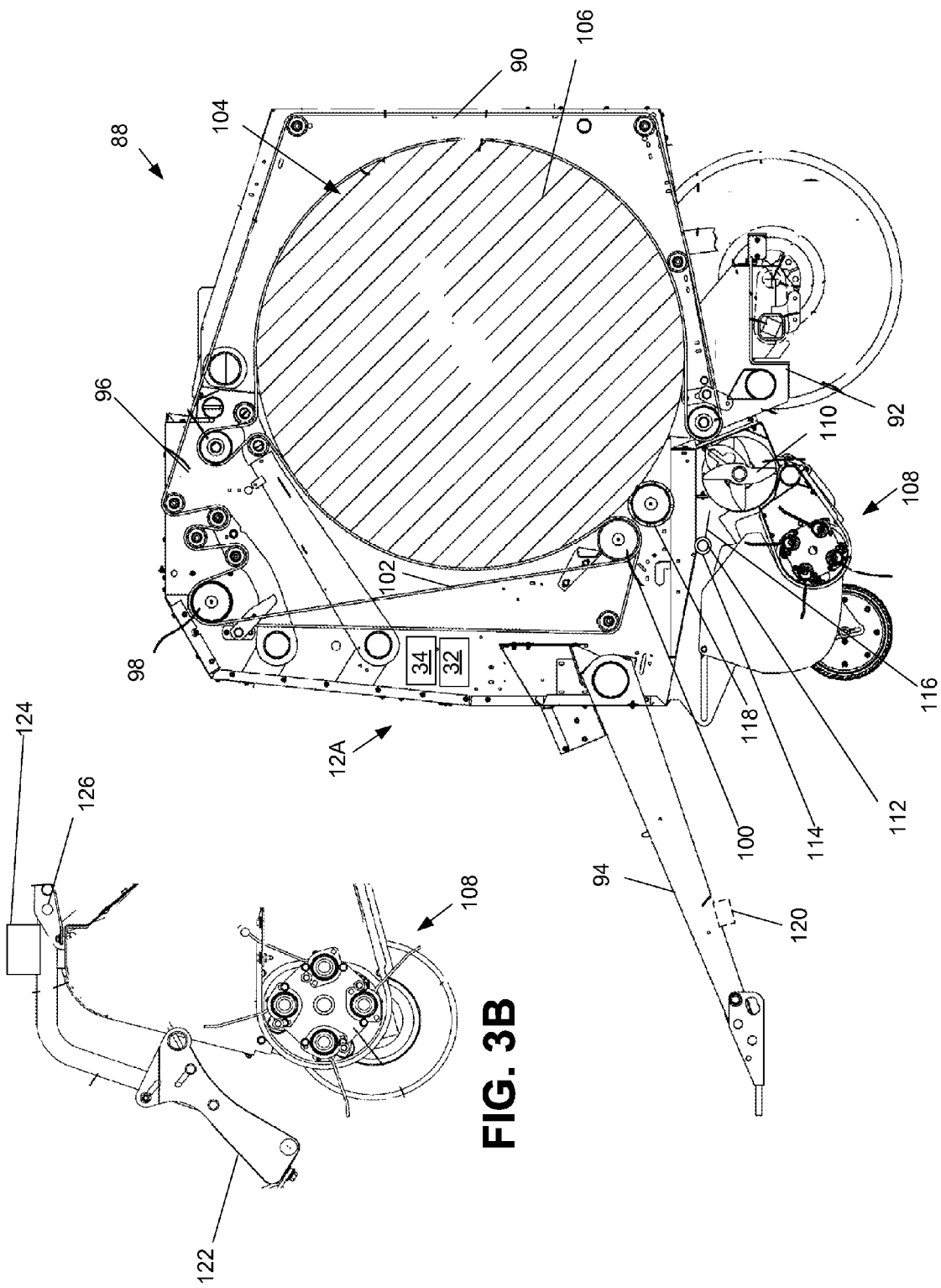

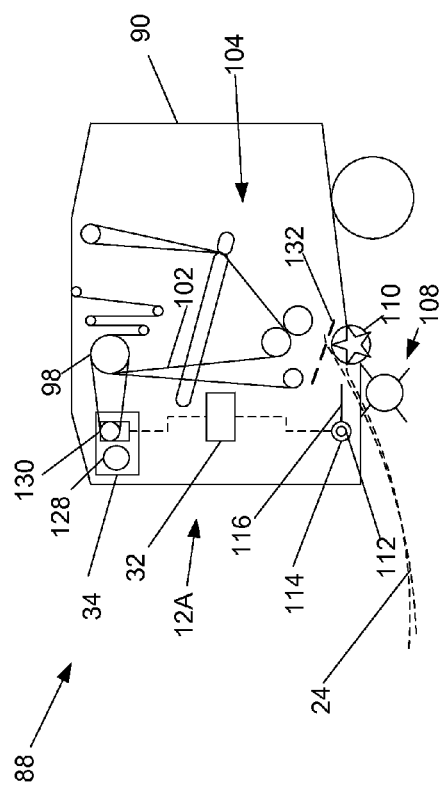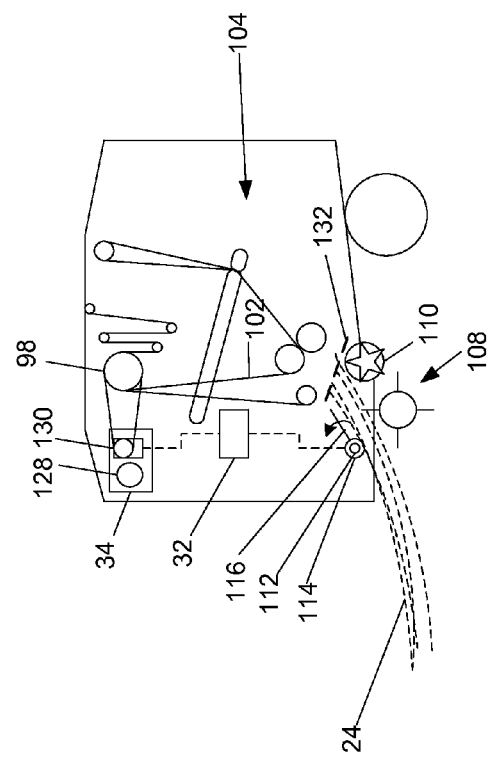

AUTOMATIC BALE FORMING CHAMBER SPEED BASED ON INCOMING CROP MASS

CROSS REFERENCE TO RELATED APPLICATION

This application claims priority to U.S. provisional application entitled, "Automatic Bale Forming Chamber Speed Based On Incoming Crop Mass," having Ser. No. 61/738,037, filed Dec. 17, 2012, which is entirely incorporated herein by reference.

TECHNICAL FIELD

The present disclosure is generally related to baling systems and, more particularly, round balers.

BACKGROUND

Conventional round balers receive crop material and form the crop material into compacted bales in a bale chamber. There are generally three major cycles in the operation of a round baler: a bale-forming cycle, a bale-wrapping cycle, and a bale-ejecting cycle. The bale chamber is typically run at a constant rotational speed throughout its bale-forming and bale-wrapping cycles.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 3A is a schematic diagram that illustrates, in side elevation, fragmentary, and partial cut-away view, another embodiment of a bale forming control system for an example baler system.

FIG. 3B is a schematic diagram that illustrates another bale forming control system implemented at least in part using a windguard attachment for the example baler system of FIG. 3A.

FIGS. 4A-4B are block diagrams that illustrate one embodiment of a bale forming control method for the example baler system of FIG. 3A.

DESCRIPTION OF EXAMPLE EMBODIMENTS

Overview

Figure 1:
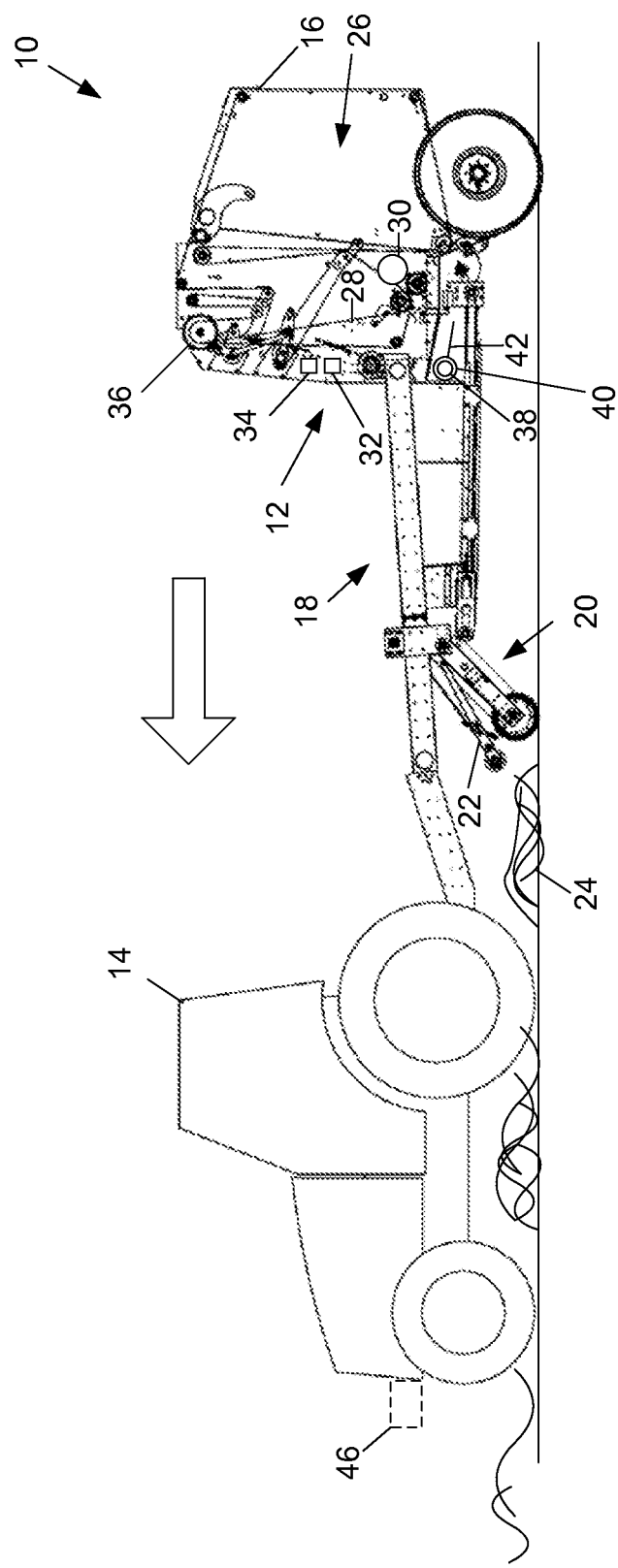
FIG. 1 is a schematic diagram that illustrates, in side elevation, fragmentary, and partial cut-away view, an example continuous baler system in which an embodiment of a bale forming control system is implemented.

In one embodiment, a bale forming control method comprising causing motion of one or more bale forming drives in a bale forming chamber of a baler; sensing an amount of the crop material before the crop material enters the bale forming chamber; and responsive to the sensed amount, adjusting a speed of forming a bale from the crop material in the bale forming chamber.

DETAILED DESCRIPTION

Certain embodiments of a bale forming control system and method are disclosed that sense an incoming crop material mass flowing into a baler and adjust a bale forming speed according to the sensed mass. In one embodiment, the bale forming control system is associated with a round baler equipped with one or more variable bale forming drives, and comprises a drive system (e.g., a hydraulic pump coupled to a motor, a motor coupled to a generator, or other mechanisms for driving the bale forming drives), a controller, and one or more sensors. For instance, a sensor (e.g., an angular position sensor, acoustic sensor, etc.) of the bale forming control system is disposed in a path of the crop material (e.g., windrow) flow prior to an inlet opening (e.g., throat) of a bale forming chamber. The sensor senses the amount of the flowing windrow (e.g., the volume, area, height, etc.). The controller is coupled to the sensor, and receives a signal from the sensor according to the amount of the windrow flowing past the sensor. The controller sends a control signal to the drive system based on the sensor signal. The drive system comprises a motor that is coupled to one or more bale forming drives, which drive the bale formation process within the bale forming chamber. The control signal causes an adjustment in operations of the hydraulic pump of the drive system, which in turn causes an adjustment of the speed of the coupled motor (e.g., increased or decreased), which causes the bale forming chamber speed to match the windrow volume.

The bale forming drives include any one or a combination of upper drive roll, lower drive roll, or other rolls (e.g., starter rolls, etc.), that directly (e.g., not passively reacting to the motion of other rolls or bale forming members) cause the rotational motion of crop material in the bale forming chamber to form into a round bale. The bale forming drives may contact the crop material directly, cause motion of the crop material through a bale forming member or members that directly contact the bale, or a combination of both through the bale formation process. For instance, bale forming members may include one or a combination of belts, chains, slats, etc., as should be appreciated by one having ordinary skill in the art. The bale forming members may rotate around other rolls, such as idler rolls, that do not directly cause the rotational motion of the bale but nevertheless rotate as a reaction to the rotation of a coupled bale forming member or members and/or rotation of the bale. For purposes of illustration, the bale forming drive used hereinafter in the disclosure is an upper drive roll, and the bale forming member is a belt or belts, with the understanding that some embodiments may use more than one bale forming drive. In some embodiments, bale formation may occur without a bale forming member or members (e.g., bale formation entirely performed by a plurality of rolls in direct contact between the bale). In some embodiments, bale formation may occur with other types of bale forming members (e.g., not limited to a belt or belts). Further, the bale formation chamber speed refers to the speed of operations of the collective apparatus of the bale formation chamber, such as the speed of rolls and belts or other bale forming members or speed of just the rolls (when there are no belts). Stated otherwise, the bale formation chamber speed refers to the speed at which a bale is rotated, which in turn, depending on the amount of crop material fed to the bale formation chamber, impacts the speed at which the bale rotates while it is being formed.

Digressing briefly, when baling light (e.g., small amount of) windrows, it is desirable to have a slow bale formation chamber speed to prevent bale deterioration. In heavier windrows, it is desirable to have a fast bale formation chamber speed to improve baler capacity. These windrow conditions may change between fields, and even within the same field on which the baler travels. Certain embodiments of a bale forming control system use one or more sensors located upstream of the bale forming chamber to determine how much crop material is about to enter into the bale chamber, and automatically adjusts the bale formation chamber speed.

In conventional systems, the operator manually alters the bale formation chamber speed by altering the power take-off (PTO) speed of the tractors, which may introduce some challenges. For instance, adjusting the speed of the PTO also adjusts the speed of the pickup elements of the baler, which may not be desirable. Further, windrow conditions may change in different areas of a field, tasking the tractor operator to skillfully adjust the drive speeds for optimum bale formation. Also, in dry and brittle conditions, some crop material is lost from the formed bale as the bale turns in the bale forming chamber. If the incoming crop material is light, it is difficult (maybe impossible in some circumstances) to slow the chamber speed enough with a conventional drive to maintain bale integrity. Certain embodiments of bale forming control systems and methods address these and/or other challenges in conventional baler design and operations.

Having summarized certain features of a bale forming control system of the present disclosure, reference will now be made in detail to the description of the disclosure as illustrated in the drawings. While the disclosure will be described in connection with these drawings, there is no intent to limit it to the embodiment or embodiments disclosed herein. For instance, though described in the context of non-continuous and continuous round baler systems, other baler systems and/or configurations may be used in some embodiments, and hence are contemplated to be within the scope of the disclosure. For instance, a baler with a bale forming drive embodied as an upper drive roll and that uses bale forming members embodied as belts to form a bale is described herein, with the understanding, as explained above, that other configurations may be used and hence are contemplated to be within the scope of the disclosure. For instance, bale forming chambers that use other or additional drive rolls to directly cause the bale rotation may be used in some embodiments. In some embodiments, bale forming members of the same or different type may be used in conjunction with rolls that contact the bale that are not coupled to the bale forming members. In some embodiments, bale forming members may be omitted. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the baler looking forwardly.

Reference is made to FIG. 1, which illustrates an example baler system embodied as a continuous baler system 10 in which an embodiment of a bale forming control system 12 is implemented. One having ordinary skill in the art should appreciate in the context of the present disclosure that the example continuous baler system 10 depicted in FIG. 1 is merely illustrative, and that other types of balers (e.g., not limited to round balers, belt-driven, etc.) and/or systems with different features (e.g., fewer or additional features) may be used as an environment in which certain embodiments of a bale forming control system 12 may be employed. In one embodiment, the continuous baler system 10 comprises a tractor 14, a baler 16, and a conveyor assembly 18 (the latter also referred to as an accumulator) coupled together. In some embodiments, the continuous baler system 10 may omit certain components, or may comprise additional components in some embodiments. The tractor 14 is equipped with a power take-off (PTO), as is well-known, to provide power to the towed baler 16 and the coupled conveyor assembly 18. It should be appreciated that the tractor 14 may be replaced with another towing vehicle (e.g., combine harvester, etc.) in some embodiments, or omitted in some embodiments (e.g., where the baler 16 is self-propelled). The baler 16 is depicted as a continuous round baler (e.g., with the conveyor assembly 18 enabling the baler 16 to form, wrap, and discharge a round bale without stopping the forward movement of the baler 16), although some embodiments may utilize other baler configurations. The conveyor assembly 18 is operatively coupled to a well-known pickup mechanism 20 proximal the forward end of the conveyor assembly 18. As should be appreciated by one having ordinary skill in the context of the present disclosure, in some embodiments, the pickup mechanism 20 may be located elsewhere (and hence omitted from the front of the conveyor assembly 18). For instance, the towing vehicle may be equipped with a pickup mechanism, and the gathered material may be discharged from the towing vehicle directly to conveyor belts (or other conveying surfaces, such as slat and chain, rollers, etc.) of the conveyor assembly 18 from the towing vehicle.

In some embodiments, the pickup mechanism 20 may operate in cooperation with a windguard 22 coupled to the pickup mechanism 20 and/or a frame of the conveyor assembly 18, as is well-known, to facilitate the pickup operation. The conveyor assembly 18 gathers crop material 24 (e.g., biomass, also referred to herein as windrow) deposited on its surface from the pickup mechanism 20 and provides the crop material 24 to an inlet opening of a bale forming chamber 26 of the baler 16. The bale forming chamber 26, in one embodiment, comprises a plurality of bale forming members, such as a plurality of forming belts 28 (herein, also referred to as simply, belts) that rotate around a plurality of rolls to form a bale 30. In some embodiments, as described above, the bale forming chamber 26 may use other types of bale forming members, such as chains, slats, etc., or none at all in some embodiments. The bale forming chamber speed (e.g., including the speed of the forming belts 28) is controlled by a controller 32 in cooperation with a drive system 34 (both shown schematically in FIG. 1 and other figures) of the bale forming control system 12. In one embodiment, the drive system 34 comprises a hydraulic pump and a motor, as explained further below, although other motive mechanisms may be used in some embodiments. In some embodiments, additional hydraulic pumps and/or motors may be used as part of the drive system 34. The drive system 34 is coupled to the controller 32 via a wireless or wired connection. The drive system 34 is also coupled to one or more bale forming drives, such as one or more drive rolls of the bale forming chamber 26. For instance, the drive system 34 may be coupled to an upper drive roll 36 (the actual coupling between the drive system 34 and the upper drive roll 36 not shown in FIG. 1). In some embodiments, the drive system 34 may be coupled to (in addition to, or in lieu of, the upper drive roll 36) a lower drive roll, a starter roll, and/or other rolls.

The controller 32 is also communicatively coupled (e.g., via a wired or wireless connection) to one or more sensors, such as a sensor 38 of the bale forming control system 12. In one embodiment, the sensor 38 is coupled to a shaft 40 that is coupled to the frame of the baler 16. In some embodiments, additional shafts with a coupled sensor may be coupled (in addition to, or in lieu of, the coupling to the frame of the baler 12) to the conveyor assembly 18 (e.g., as part of an intermediate feeding assembly, such as a screed or auger (not shown), or simply as part of a dedicated monitoring method to allow the sensor to monitor the amount of crop material conveyed on the conveyor assembly 18), including as part of the structure of the windguard 22, and/or to the tractor 14. Also coupled to the shaft 40 is a sensor arm 42. In one embodiment, the sensor arm 42 may be configured as a panel that extends transversely (e.g., entirely or in part) along the width of the bale forming chamber 26. In some embodiments, the sensor arm 42 may be a rod that contacts the crop material 24 at a limited location. In some embodiments, a plurality of sensor arms 42 may be disposed transversely (e.g., entirely or in part) along the width of the bale forming chamber 26. In some embodiments, the sensor arm 42 may have a wheel or other rotation member disposed at the crop engaging end of the sensor arm 42. The sensor arm 42 pivotally rides or slides along the top of the incoming crop material 24 prior to the crop material 24 entering the inlet opening of the bale forming chamber 26. Although one sensor 38 and sensor arm 42 combination is depicted in FIG. 1, there may be a plurality of sensor 38 and sensor arm 42 combinations coupled to the shaft 40 and/or elsewhere in the continuous baler system 10. In some embodiments, the shaft 40 is fixed (e.g., non-rotating) and the sensor arm 42 is rotatably coupled to the shaft 40. In some embodiments, the shaft 40 is rotatable, and the sensor arm 42 is fixed (e.g., non-rotating) to the shaft 40. The sensor 38 senses the rotating action of the shaft 40 or sensor arm 42 (e.g., via the angular displacement of the shaft 38 or the angular displacement of the sensor arm 42) as the volume of incoming crop material changes, the volume change causing the sensor arm 42 (or shaft 40) to pivot about the axis of the shaft 40 as the sensor arm 42 rises and falls with the crop material. For illustrative purposes, one example sensor 38 may be a Power Components RS80 rotary hall effect sensor.

In some embodiments, a sensor may be located elsewhere (e.g., instead of coupled to the shaft 40, or in addition to being coupled to the shaft 40), such as a sensor coupled to a shaft (not shown) of the windguard 22 and/or coupled to a shaft (not shown) of the tractor 14.

Although described using angular displacement-type sensors 38, it should be appreciated that other types of sensors may be used. For instance, as shown in phantom in FIG. 1, a sensor 46 may be coupled to the front of the tractor 14 (or elsewhere on the tractor 14 in some embodiments), or in other locations (e.g., to a frame of the baler 16 and/or to the conveyor assembly 18) upstream of the inlet opening of the bale forming chamber 26 in some embodiments. In one embodiment, the sensor 46 comprises an acoustic sensor that monitors the amount of crop material 24 that the tractor 14 is travelling over. For illustrative purposes, one example sensor 46 may be a Senix LVL-100 ToughSonic® Level Sensor. Other types of sensing devices may be used, and in some embodiments, the sensor 46 may be used in addition to other sensors, such as in use with the sensor 38. The sensor 46, like other sensors described herein, communicates (e.g., via a wireless or wired medium) with the controller 32, providing a different or variable signal depending on the amount of crop material 24. The information from the sensor 46 is used to adjust the speed of bale rotation.

Referring to operations between the sensor 38 and the controller 32, and assuming an embodiment where the shaft 40 is rotatable (with similar applicability to a fixed-shaft 40 and rotatably coupled sensor arm 42), the sensor 38 is coupled to, and senses the rotation of, the shaft 40, and the change in rotation is converted by the sensor 38 to a signal that is communicated to the controller 32. The signal may be a voltage or current signal (e.g., analog or digital), and may be communicated to the controller 32 via a wired or wireless medium, directly or in some embodiments, through an intermediate device or devices. In response to receiving the signal from the sensor 38, the controller 32 provides a control signal to the drive system 34, which causes the bale forming chamber speed (e.g., including the drive rolls, such as the upper drive roll 36, and the forming belts 28, though in some embodiments may include drive rolls that do not couple to the forming belts 28 yet directly contact the bale 30 and cause the rotational motion of the bale 30) to speed up or slow down, depending on the signal, the nature of the signal according to the crop material amount sensed by the sensor 38. The control signal delivered to the drive system 34 may be a variable voltage or variable current signal (e.g., analog or digital), delivered by the controller 32 (via a wired or wireless medium) directly to the drive system 34 or indirectly via an intermediate device or devices. The drive system 34 in turn ramps up or down the speed of the forming belts 28, causing an adjustment to the bale rotation (and formation, where crop material continues to be fed) speed. In some embodiments, the controller 32 may change the speed responsive to a threshold change in the incoming crop material (e.g., based on the magnitude of the signal received from the sensor 38 or based on a defined difference between the last signal value (or an average or the like of those signals) and the prior signal(s) in some embodiments. In some embodiments, the signal from the sensor 38 may be delivered to the controller 32 continuously, periodically, or aperiodically (e.g., according to a given event or condition, such as responsive to threshold changes in cop material volume).

Explaining operations of the bale forming control system 12 further, in one embodiment, and referring in particular to the drive system 34, the hydraulic pump is a variable-displacement pump driven by the tractor PTO. The hydraulic pump may supply fluid (e.g., oil) to one or more motors of the drive system 34, which in turn drives the upper drive roll 36 (and/or other drive roll or rolls in some embodiments). Accordingly, the tractor PTO remains constant, and the hydraulic pump changes, for instance, a swashplate angle to send more or less oil to the motor. The motor rotation, responsive to the varying amount of oil, speeds up or slows down and thus varies the speed of the coupled upper drive roll 36. In some embodiments, the motor may also be of a variable displacement design, enabling additional speed ratios. In some embodiments, the forming belts 28 may be driven by a variable speed sheave, where instead of changing the swashplate angle of the hydraulic pump, a pulley diameter is adjusted to change the speed of the forming belts 28. Other mechanisms for causing speed adjustments may be used, as should be appreciated by one having ordinary skill in the art. As indicated above, in some embodiments, the forming belts 28 may be omitted, and the drive system 34 may directly cause the rotational motion of rolls that directly contact the bale 30. In some embodiments, the drive system 34 may directly cause the rotational motion of rolls that contact the bale directly and rolls that drive a belt or belts that directly contact the bale 30.

Note that in some embodiments, a second hydraulic pump, also driven by the tractor PTO, may be used to supply power for the pickup mechanism 20, any screed (not shown), and/or conveyor assembly motors, and is typically of an open-circuit design enabling the flow of oil from the second pump to be used for hydraulic cylinders, such as tailgate cylinders of the baler 12 or screed up and down cylinders (when a screed is used in cooperation with the conveyor assembly 18).

Figure 2:
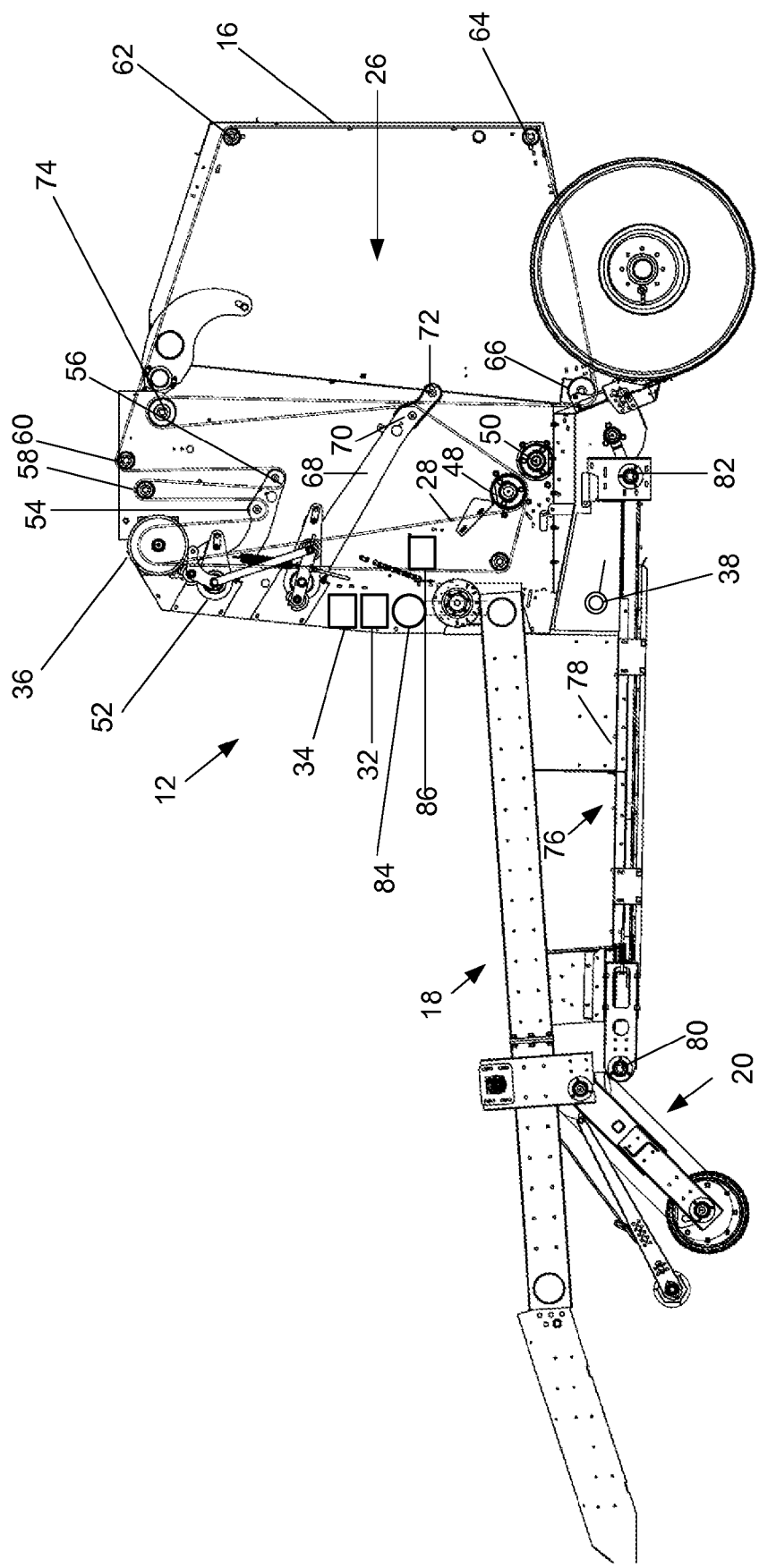
FIG. 2 is a schematic diagram that illustrates, in side elevation, fragmentary, and partial cut-away view, an embodiment of a bale forming control system for an example continuous baler system.

Referring now to FIG. 2, shown in side elevation, fragmentary and partially cut-away view is the baler 16 and conveyor assembly 18, and an embodiment of the bale forming control system 12. It should be appreciated that the example baler 16 is merely illustrative of one example among other configurations. For instance, in some embodiments, a fixed chamber baler (e.g., capable of making bales of a single diameter in size) may be used and hence are contemplated to be within the scope of the disclosure. Focusing attention initially on the baler 16, the bale forming chamber 26 comprises a lower drive roll 48 and a starting roll 50. Above the lower drive roll 48 is the upper drive roll 36. As indicated above, the upper drive roll 36 comprises a bale forming drive, though in some embodiments, the lower drive roll 48 and/or starting roll 50 (and/or other rolls) may comprise a bale forming drive in addition to, or in lieu of, the upper drive roll 36. Pivotally mounted within the baler 16 is a belt tension arm 52 to which are pivotally mounted a front belt tension roll 54 and a rear belt tension roll 56. At the top of the front portion of the bale forming chamber 26 is a front upper idler roll 58 and a rear upper idler roll 60. Following the interior of the baler wall around clockwise, there is a tailgate belt roll 62 a lower rear tailgate roll 64, and front lower idler roll 66. A bale density arm 68 is pivotally mounted within the baler 16 and has a front bale density roll 70 and a rear bale density roll 72, both pivotally mounted on the distal end from the pivotal mounting of the bale density arm 68. Near the top of the bale forming chamber 26 above the bale density rolls 70 is depicted an upper bale chamber roll 74. A plurality of the bale forming belts 28 are threaded around each of the above identified rolls as depicted in FIG. 2. The bale forming belts 28 are tensioned by the front and rear belt tension rolls 54, 56, mounted on the belt tension arm 52 and the rolls 70, 72 mounted on the bale density arm 68. As the operations (e.g., for conventional, fixed speed bale chambers, which may be extended here based on the context of the present disclosure) of the bale forming chamber 26 are known to those having ordinary skill in the art, further description of the same is omitted here for brevity.

Turning focus now on the conveyor assembly 18, the conveyor assembly 18 comprises a conveyor 76 having one or more endless (e.g., as manufactured, either via a formed endless belt or linear strips assembled together), moveable conveyor belts 78 that are coupled to (e.g., wrapped in part around) fore and aft positioned rolls 80 and 82 running transversely to the movement of the conveyor belts 78. For instance, in one embodiment, the conveyor belt 78 may be a single belt, with an integral structure configured similarly (yet scaled) to that typically seen on a treadmill. In some embodiments, there may be a plurality of parallel spaced, endless conveyor belts 78 that collectively define the conveyor 76. As explained above, the conveyor belts 78 may be integrally formed or stitched or otherwise connected together. The conveyor belts 78 may be positioned fore and aft around rolls 80 and 82, arranged side-by-side with little or no gap between the conveyor belts 78. In the description hereinafter, reference to the conveyor 76 of the conveyor assembly 18 contemplates the use of plural endless belts 78, with the understanding that a single, integral belt 78 may also apply. A top surface of each of the belts 78 defines a movable, accumulating and conveying surface for receiving the crop material 24 (FIG. 1) from the pickup mechanism 20 (or directly from the towing vehicle) and conveying the crop material 24 to an inlet opening of the bale forming chamber 26 of the baler 16 where the bale 30 (FIG. 1) is formed.

The pickup mechanism 20 gathers the crop material 24 (FIG. 1) from the ground and transfers (e.g., deposits) the crop material 24 to the top surface of the conveyor belts 78 at the front end of the conveyor 76. The crop material 24 is conveyed by the conveyor 76 as the top strands of the conveyor belts 78 move toward the inlet opening of the baler 16.

The conveyor 76 and the pickup mechanism 20 may be driven by independent drive systems in one embodiment, though a common drive system may be used in some embodiments (the independent drive systems partially shown in FIG. 2). For instance, a drive system for the pickup mechanism 20, as is well-known in the art, may include a hydraulic motor having a motor drive wheel. For example, the hydraulic motor may be mounted on a motor mounting plate and arranged to rotate a pickup drive wheel, which in turn rotates a pickup drive roll. Similarly, a drive system for the conveyor 76 may comprise a hydraulic motor that may also be arranged to drive a conveyor drive wheel associated with the conveyor drive roll 82. For example, for each drive system, a drive belt or chain may be looped around the drive wheel and the pickup drive wheel or the conveyor drive wheel, as applicable, so that when the drive wheel is rotated, the pickup drive wheel or the conveyor drive wheel also rotates and in turn rotates the pickup roll or the conveyor drive roll 82 via the respective drive belt.

As is well-known, fluid may be provided to the hydraulic motors of each drive system by a hydraulic pump 84 (e.g., directly, or typically indirectly via a manifold 86 that comprises solenoids and/or flow control valves) via hoses (not shown) to provide variable (or in some embodiments, fixed) fluid flow to control (e.g., vary) the speed of the motors of the pickup mechanism 20 and conveyor 76. The hydraulic pump 84 may be dedicated to the pickup mechanism 20 and conveyor 76, as described above, whereas another hydraulic pump of the drive system 34 may be used for providing power for other baler operations (e.g., for driving the upper drive roll 36 and/or other rolls). In some embodiments, a single hydraulic pump may be used in place of the two hydraulic pumps, or in some embodiments, additional hydraulic pumps may be used. Though depicted as residing in the baler 16, one or both of the hydraulic pumps may be located elsewhere. The hydraulic pump 84 and the hydraulic pump of the drive system 34, as described above, may be powered by the PTO of the tractor 14 (FIG. 1), or in some embodiments, by power generated locally (e.g., power source residing in the baler 16). It should be appreciated within the context of the present disclosure that, though a hydraulic motive force is described, other motive forces (e.g., electrical and/or mechanical) may be used in some embodiments.

The immediately aforementioned arrangement enables the operations of the conveyor 76, pickup mechanism 20, forming belts 28, and upper drive roll 36 to be controlled by one or more controllers, such as the controller 32. The controller 32 enables the conveyor 76 to be operated in the material-conveying direction (e.g., toward the baler 16) as well as in the reverse direction. For instance, the controller 32 (e.g., responsive to operator intervention or automatically based on a sensed condition and/or machine parameter(s)) may deliver control signals to the manifold 86 to manipulate hydraulic fluid provided to the motors of the conveyor 76 and/or pickup mechanism 20 via the hoses, and thus control the movement of the conveyor belts 78 and pickup mechanism 20. The controller 32 also receives signals from one or more sensors, such as sensor 38, and responsively provides variable control signals to the drive system 34 (e.g., hydraulic pump) in the manner described above to control the speed of the forming belts 28.

The baler 16 comprises well-known componentry and/or sub-systems for bale wrapping and bale discharge operations not described here. Further description of an example round baler may be found in commonly-assigned United States patent publication number 20110023442.

Attention is now drawn to FIG. 3A, which is a schematic diagram that illustrates, in side elevation, fragmentary, and partial cut-away view, another embodiment of a bale forming control system 12A for an example baler system 88. Note that the example baler system 88 is merely illustrative of one baler configuration, and that in some embodiments, other configurations may be used such as fixed chamber-type balers. The example baler system 88 may also include, in some embodiments, a towing vehicle, such as the tractor 14 of FIG. 1. The baler system 88 comprises a baler 90, which in one embodiment is a round baler, though not limited to a round baler configuration. The baler 90 comprises a chassis broadly denoted by the numeral 92 that is supported by a pair of left and right ground wheels (one shown) for travel across the field and along roads and highways. A tongue 94 projecting forwardly from the chassis 92 adapts the baler 90 for connection to a towing vehicle (not shown).

As well understood by those having ordinary skill in the art, the baler 90 includes a pair of opposite side panels, such as panel 96, that cooperate with a multiplicity of transversely extending rollers, such as upper drive roll 98 and lower drive roll 100, among others shown, and forming belts 102, to define a bale forming chamber 104. In the illustrated embodiment, the bale forming chamber 104 (similar to bale forming chamber 26 of FIG. 1) is a variable-size chamber wherein the chamber is relatively small at the beginning of a baling cycle and then progressively enlarges as the cycle continues until reaching a full size condition as illustrated in FIG. 3A wherein a full size bale 106 is disposed therein. The belts 102 are maintained under tension during the baling cycle and are driven in such a direction that the bale 106 rotates in a counterclockwise direction viewing FIG. 3A during the cycle, thus causing the bale 106 to be compacted as it turns and as additional crop material is introduced into bale forming chamber 104 throughout the cycle.

Rear portions of the side panels (e.g., panel 96) and the belts 102 define a tailgate that may be raised to open the chamber 104 at the completion of a baling cycle for the purpose of ejecting the bale 106 therefrom, as is well-known. With the tailgate raised, the bale 106 simply drops out of the opened chamber 104 onto the ground, whereupon a conventional kicker (not shown) may be actuated to engage the bale 106 and move it rearwardly a sufficient extent to permit the tailgate to be closed.

At the front of baler 90, generally below the bale forming chamber 104, is disposed a pickup mechanism 108 that may be of conventional construction for the purpose of picking up the crop material from the ground as the baler 90 is advanced forwardly and delivering such crop materials into the lower front portion of bale forming chamber 104. A variety of such pickups and associated mechanisms, such as a center-gathering auger 110, may be utilized (or omitted in some embodiments).

The bale forming control system 12A comprises the drive system 34 and the controller 32, as well as one or more sensors located upstream of the inlet opening of the bale forming chamber 104. In the embodiment depicted in FIG. 3A, a sensor 112 is shown coupled to a shaft 114 and/or sensor arm 116, similar to the configuration described above for the sensor arm 42 (FIG. 1). Similar to the sensor arrangement described in association with FIGS. 1-2, the rotational displacement of the sensor arm 116, according to the amount of crop material flowing in the flow path defined by the pickup mechanism 108 and the auger 110 located upstream of the inlet opening of the bale forming chamber 104, is detected by the sensor 112. The sensor 112 in turn communicates a signal to the controller 32. The controller 32 responsively provides a control signal to the drive system 34, which through the above-described coordination between the hydraulic pump and motor, drives the upper drive roll 98 (and in some embodiments, other or additional rolls such as the lower drive roll 100 and/or a starter roll 118) in a manner that increases or decreases the bale forming chamber speed. Operations and variations of the bale forming control system 12 described above in conjunction with FIGS. 1-2 similarly apply here, and hence description of the same is omitted here for brevity.

In some embodiments, additional sensors or different sensor placement (compared to the sensor displacement depicted in FIG. 3A) may be used, such as a sensor 120 (shown in phantom) affixed to the tongue 94. In one embodiment, the sensor 120 may be an acoustic sensor, among other types of sensors, that enables the determination of crop material amount (e.g., volume) upstream of the bale forming chamber. In some embodiments, the sensor 120 may be located on a frame of the baler 90 (e.g., in addition to, or in lieu of, the sensor 114) upstream of the inlet opening of the baler 90. The amount (or change thereof) of the crop material to be encountered by the baler 90 as it is pulled (or in some embodiments, as it travels according to self-propelled mechanisms) is sensed, and the sensor 120 sends a corresponding signal to the controller 32. The controller 32 in turn sends a control signal to the drive system 34, which causes the roll 98 (and/or another roll or rolls in some embodiments) to increase or decrease in rotational speed, causing the bale forming chamber speed to increase or decrease as well.

In some embodiments, a different sensor placement (or additional sensor placement in some embodiments) may be used, such as shown in FIG. 3B, which shows a windguard 122, which may be added to (or associated with) the pickup mechanism 108 of FIG. 3A. For instance, a sensor 124 may be coupled to a shaft 126 that enables rotational or pivotal motion of the windguard 122, the sensor 124 detecting the amount of, and variations in, the crop flow amount as the pickup mechanism 108 gathers the crop material from the ground. In some embodiments, the shaft 126 may be fixed and the windguard 122 rotatably coupled to the fixed shaft 126, and in some embodiments, the windguard 122 may be fixably coupled to the shaft 126 as the shaft 126 rotates. In either case, the sensor 124 senses the pivoting windguard movement. Similar to that described above, the sensor 124 may communicate a signal, which varies depending on the crop amount, to the controller 32, which in turn sends a control signal to the drive system 34 to cause an increase or decrease in the bale formation process (e.g., bale forming chamber speed). In some embodiments, a different type of sensor may be used, such as an acoustic sensor, among others.

Having described some examples of how the bale forming control system 12 and 12A may be used in certain environments, attention is directed to FIGS. 4A-4B. FIGS. 4A-4B are the same as the baler system 88 depicted in FIG. 3A, and illustrate one example process for sensing the amount of crop material flowing into the bale forming chamber 104 of the baler 90. It should be appreciated in the context of the present disclosure that other baler configurations and/or sensing arrangements may be used and are contemplated to be within the scope of the disclosure, and that the process depicted in FIGS. 4A-4B is merely for illustration. As shown, the baler system 88 comprises the baler 90 traversing a field, where the pickup mechanism 108 is gathering crop material 24 from the ground. The baler 90 comprises the upper drive roll 98 that, in one embodiment, drives the forming belts 102 around the rolls of the bale forming chamber 104. The baler 90 comprises a bale forming control system 12A. The bale forming control system 12A comprises the controller 32, the sensor 112, and the drive system 34. In one embodiment, the sensor 112 is coupled to a rotatable shaft 114, the rotatable shaft fixedly coupled to the sensor arm 116. The crop material 24 is depicted as being relatively light in volume, and hence the sensor arm 116 engages (e.g., rides along the surface of) the crop material 24 according to a first rotational angle as depicted in FIG. 4A. The rotational angle of the shaft 114 (by virtue of the orientation of the sensor arm 116 as the sensor arm 116 rides along the crop material 24) is sensed by the coupled sensor 112. The sensor 112 communicates a signal (e.g., 1V signal, depicted with a dashed line between the sensor 112 and the controller 32) to the controller 32 based on the angular position of the shaft 112. The controller 32 in turn sends a control signal (depicted in FIG. 4A as a dashed line between the controller 32 and the drive system 34) to the drive system 34. The drive system 34 comprises a hydraulic pump 128 coupled to a motor 130, the motor 130 shown engaged (e.g., via a pulley arrangement, though not limited as such) to the upper drive roll 98. The hydraulic pump 128 receives the control signal, which causes the hydraulic pump 128 to communicate a dynamically determined quantity of oil (or other fluid) to the motor 130 that corresponds to the desired motor speed (e.g., 200 RPM) suitable to rotate (and form) a bale based on the crop material volume. The motor 130 in turn adjusts its speed, which causes the upper drive roll 98 to be adjusted in rotational speed. The coupling of the upper drive roll 98 with the forming belts 102 results in an adjustment in the speed of the forming belts responsive to the adjusted motor speed (and hence responsive to the crop amount). Also depicted in FIG. 4A is the sensing of the crop material amount upstream of the inlet opening 132 of the bale forming chamber 104, such as proximal to where the crop material is conveyed by the pickup mechanism 108 and auger 110. In some embodiments, sensors may be located further upstream of the inlet opening 132, or in some embodiments, other types of sensors (e.g., acoustic) may be used in place of (or in addition to) the sensor 112.

The controller 32 may determine the appropriate hydraulic adjustment (and hence motor speed adjustment) via a stored look-up table that associates a given crop material quantity with suitable parameters or settings for the hydraulic pump 128 and motor speed. In some embodiments, the adjustments may be determined algorithmically by the controller 32. In some embodiments, the controller 32 may receive additional data, such as weather conditions, moisture content, among other environmental or machine parameters that are sensed or inputted (e.g., manually via an operator) to arrive at the proper computed or looked-up adjustment parameters.

Referring now to FIG. 4B, the crop material 24 is shown as increased in volume as it passes over the pickup mechanism 108 and auger 110 upstream of the inlet opening 132 of the bale forming chamber 104. The difference in volume of crop material (from that shown in FIG. 4A) causes the rotation (represented by the counterclockwise arrowhead) of the sensor arm 116 as the sensor arm 116 rides along the top of the crop material 24. This rotational displacement is sensed by the sensor 112 sensing the rotational movement of the shaft 114 which rotates in kind with the sensor arm 116. Responsively, the sensor 112 communicates a signal (e.g., a 4V signal) to the controller 32. The controller 32 processes the signal, and determines a suitable adjustment parameter for the hydraulic pump 128 and motor 130 of the drive system 34. The controller 32 then sends a signal to the drive system 34 to cause the appropriate adjustments, in this example, the adjustments resulting in an increase in the motor speed (e.g., 500 RPM) and consequently the speed of the bale rotation (and formation) in the bale forming chamber 104 through the coupling of the motor 130, upper drive roll 98, and belts 102.

Figure 5A:
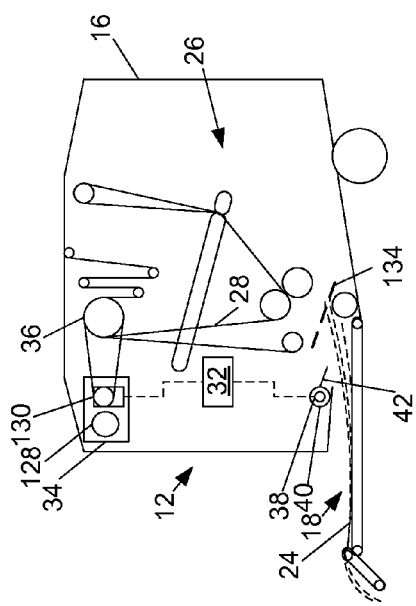
FIGS. 5A-5B are block diagrams that illustrate one embodiment of a bale forming control method for the example continuous baler system of FIG. 2.
Figure 5B:
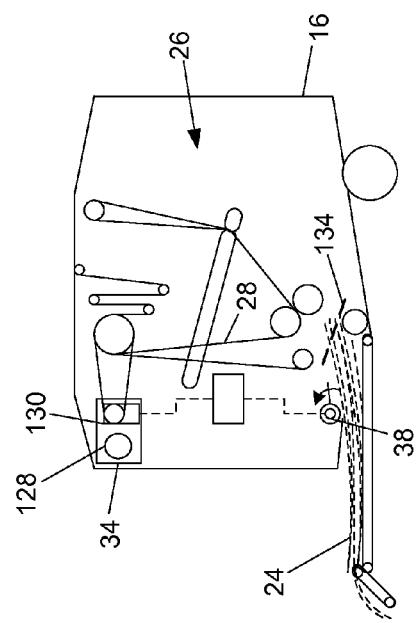

FIGS. 5A and 5B show the baler 16 and conveyor assembly 18 of the continuous baler system 10 of FIGS. 1-2, illustrating another example process for sensing the amount of crop material flowing into the bale forming chamber 26 of the baler 16. It should be appreciated in the context of the present disclosure that other baler configurations and/or sensing arrangements may be used and are contemplated to be within the scope of the disclosure, and that the process depicted in FIGS. 5A-5B is merely for illustration. As shown, the baler 16 comprises the bale forming control system 12, which in one embodiment includes the sensor 38, shaft 40, and sensor arm 42 arrangement as described above. The baler 16 further comprises the controller 32 and the drive system 34, the drive system 34 comprising the hydraulic pump 128 and motor 130 coupled to the hydraulic pump 128. Also depicted is the upper drive roll 36 of the baler 16. The upper drive roll 36 is coupled to, and drives, the forming belts 28. As shown in FIG. 5A, the crop material 24 is conveyed on the conveyor assembly 18 toward the baler 16, and the amount of the crop material 24 is sensed by the sensor 38 (e.g., via sensing the rotation displacement of the shaft 40 in the depicted embodiment as the sensor arm 42 engages the crop material before reaching the inlet opening 134 of the bale forming chamber 26). Similar to the process described above, the sensor 38 communicates a signal (e.g., 1V) to the controller 32, which in turn determines the appropriate adjustments for the drive system 34. The controller 32 sends a control signal to the drive system 34, which causes an adjustment to the hydraulic pump 128 and motor 130 that causes the upper drive roll 36 (and hence the belts 28) to operate at a suitable bale rotation speed (e.g., 200 RPM). The speed of the bale rotation is dependent on the crop material amount detected by the sensor 38 upstream of the inlet opening 134 of the bale forming chamber 26.

Referring to FIG. 5B, shown is an increase in volume of crop material 24 sensed by the sensor 38 (in the manner as described above) upstream of the inlet opening 134 of the bale forming chamber 26 of the baler 16. The sensor 38 communicates a signal (e.g., 4V) to the controller 32 corresponding to the sensed volume. The controller 32 determines the appropriate adjustment for the hydraulic pump 128 and hence motor 130 of the drive system 34, and communicates a control signal to put into effect those adjustments to the drive system 34. Accordingly, the motor speed is adjusted (e.g., to 500 RPM), which causes, through the motor-upper drive roll coupling, an increase in the speed of the belts 28 and hence the bale rotation (and bale forming process). Similar to the description associated with the examples in FIGS. 4A-4B, other sensed or inputted data may be used by the controller 32 to effect the appropriate speed adjustments.

It should be appreciated that the values of voltage and/or motor speed are for illustration only, and that other values of voltage, or in some embodiments, current signals, may be used to achieve the adjustments to the bale forming process based on the sensed crop material volumes. In some embodiments, the signaling differences may be achieved by differences in binary or other codes communicated as part of digital signals. In some embodiments, adjustments in speed may be based on a difference (e.g., a threshold difference) from a prior speed setting according to the crop material volume that is sensed.

Figure 6:
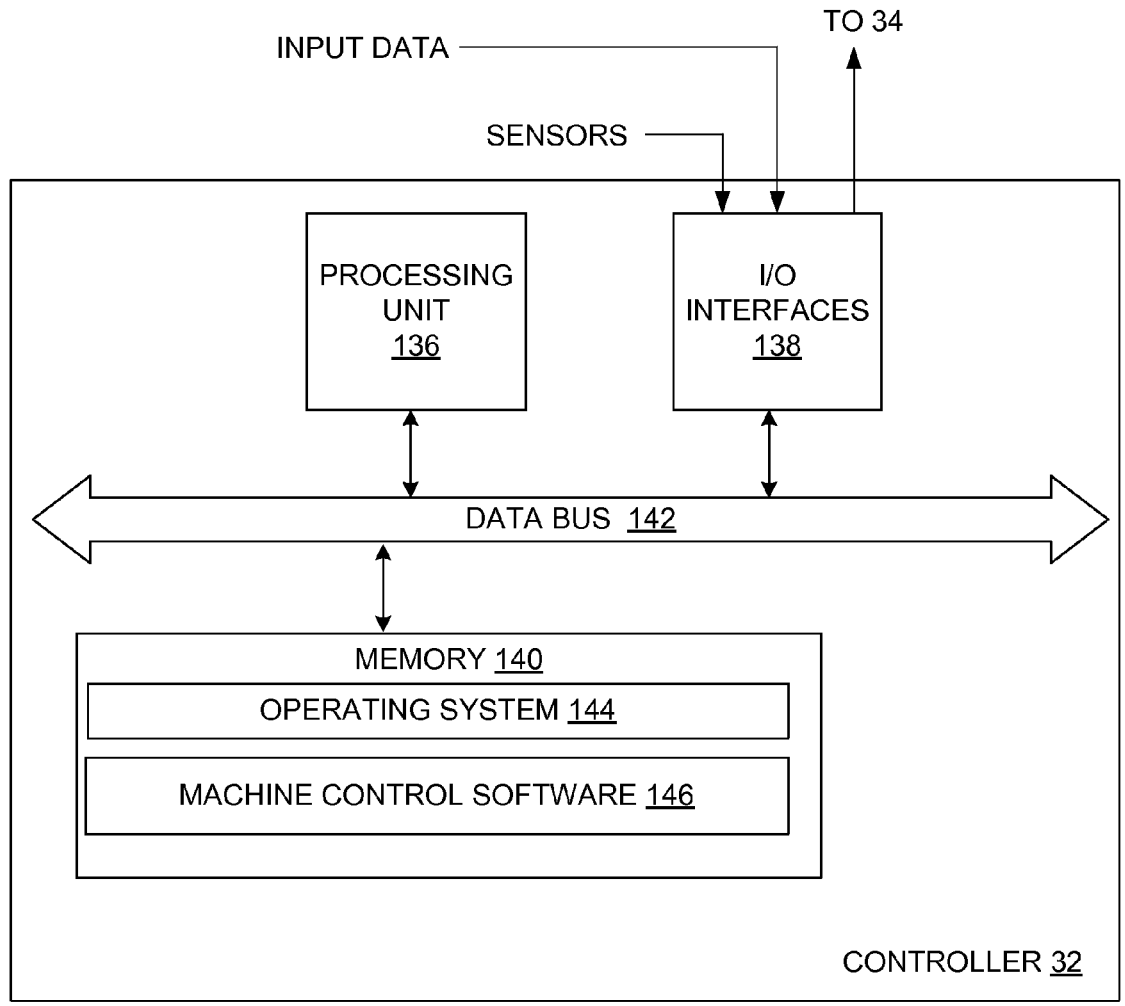
FIG. 6 is a block diagram of an embodiment of a controller.

Attention is now directed to FIG. 6, which illustrates an embodiment of a controller 32. One having ordinary skill in the art should appreciate in the context of the present disclosure that the example controller 32 is merely illustrative, and that some embodiments may comprise fewer or additional components. In one embodiment, the controller 32 comprises a computing device having one or more processing units 136, input/output (I/O) interface(s) 138, and a memory 140, all coupled to one or more data busses, such as data bus 142. The memory 140 may include any one or a combination of volatile memory elements (e.g., random-access memory RAM, such as DRAM, and SRAM, etc.) and nonvolatile memory elements (e.g., ROM, hard drive, tape, CDROM, etc.). The memory 140 may store a native operating system, one or more native applications, emulation systems, or emulated applications for any of a variety of operating systems and/or emulated hardware platforms, emulated operating systems, etc. In the embodiment depicted in FIG. 6, the memory 140 comprises an operating system 144 and machine control software 146. It should be appreciated that in some embodiments, additional or fewer software modules (e.g., combined functionality) may be employed in the memory 140 or additional memory.

The machine control software 146 comprises instructions (e.g., executable code) that are executed by the processing unit 136 under the management and control of the operating system 144 to enable the control of the bale forming control system 12 (and 12A). For instance, the machine control software 146 receives sensor input and any other device or user input data and determines suitable hydraulic pump and motor parameters and/or settings to enable the bale forming chamber speed to increase or decrease based on the incoming crop material amount sensed upstream of the inlet opening of the baler 16 (or 90). The machine control software 146 may manage a data structure stored in memory 140, such as a look-up table, that associates certain crop material amounts and detected or inputted data corresponding to conditions (e.g., crop material conditions, crop material type, sensed environmental conditions, etc.) and machine parameters (e.g., speed of travel, machine incline, etc.) to select a suitable adjustment for the drive system 34 to increase or decrease the bale forming chamber speed. In some embodiments, the machine control software 146 may select suitable adjustments for proper bale forming chamber speed based on one or more algorithms that involves determinations of the aforementioned conditions and/or parameters.

The processing unit 136 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 32.

The I/O interfaces 138 provide one or more interfaces for the input of sensor and/or other data, and for the delivery of control signals to various devices, such as to the hydraulic pump 128 of the drive system 34. The I/O interfaces 138 also provides one or more interfaces to any internal network of the continuous baler system 10 (or baler system 88), such as a CAN network among the towing and towed vehicles. The I/O interfaces 138 may include transceiver functionality to enable communications via any external network, such as for receiving and/or sending radio frequency or other electromagnetic spectrum signaling from and/or to a remote device (e.g., remote server, remote computer, etc.).

Memory 140 may be configured as any non-transitory, computer-readable medium for use by, or in connection with, a variety of computer-related systems or methods. In the context of this document, a computer-readable medium may comprise an electronic, magnetic, optical, or other physical device or apparatus that may contain or store a computer program for use by or in connection with a computer-related system or method.

Although the machine control software 146 is depicted in software (including firmware embodiments), one or more of the machine control software functionality may be performed in hardware. For instance, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 7:
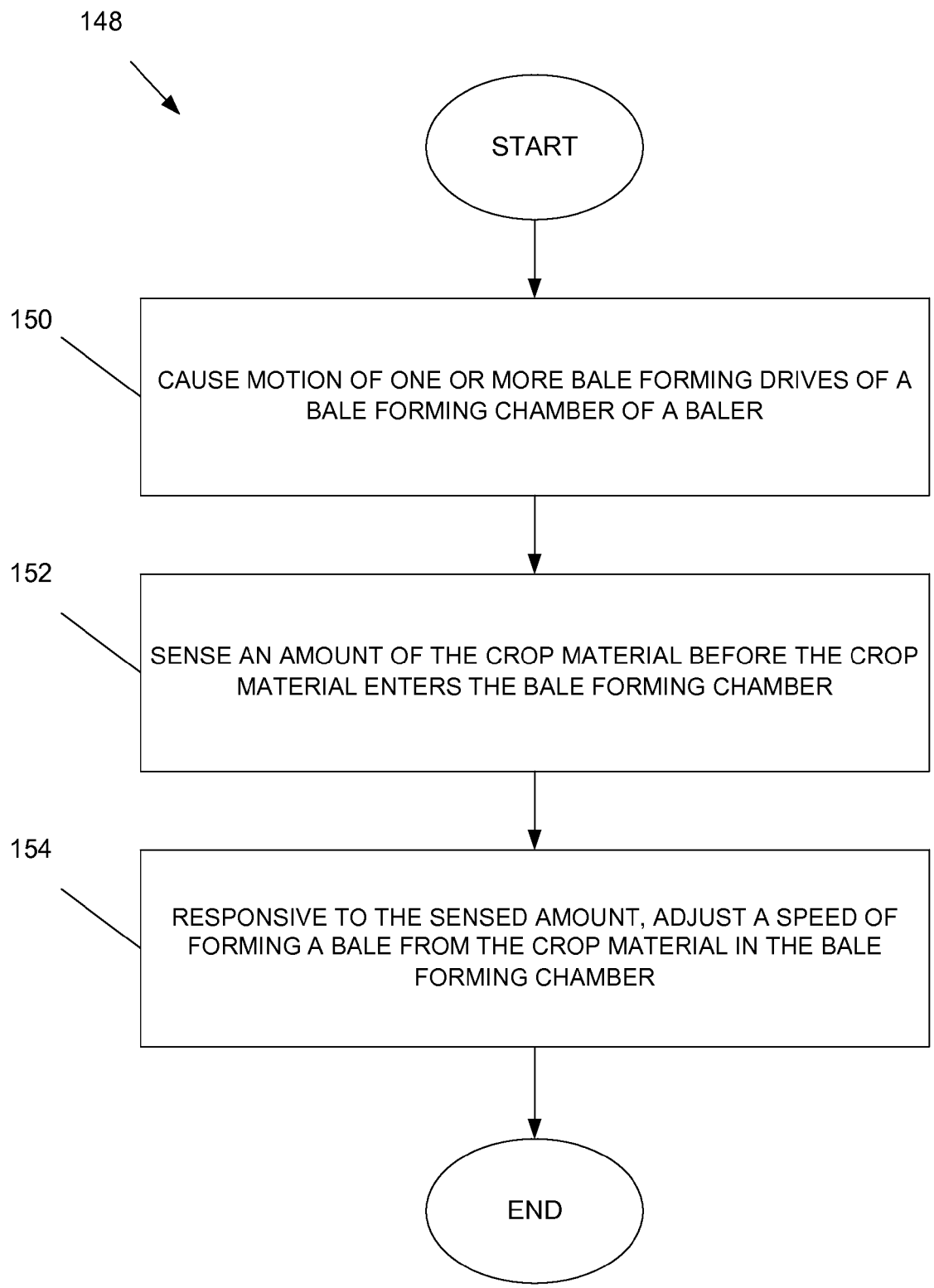
FIG. 7 is a flow diagram that illustrates an example embodiment of a bale forming control method.

In view of the above description, it should be appreciated that one embodiment of a continuous baling method, as depicted in FIG. 7 and denoted as a bale forming control method 148, comprises causing motion of one or more bale forming drives of a bale forming chamber of a baler (150); sensing an amount of the crop material before the crop material enters the bale forming chamber (152); and responsive to the sensed amount, adjusting a speed of forming a bale from the crop material in the bale forming chamber (154).

Note that steps in the process, and alternate implementations are included within the scope of the embodiments in which functions may be performed out of order from that shown or discussed, including substantially concurrently or in reverse order, depending on the functionality involved, and/or additional or fewer steps performed, as should be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The invention claimed is:

1. A bale forming control system, comprising:
a baler comprising a bale forming chamber, the bale forming chamber comprising at least one bale forming belt and at least one bale forming drive configured to rotate the at least one bale forming belt;
a sensor disposed upstream of an inlet opening of the bale forming chamber, the sensor configured to sense an amount of crop material upstream of the inlet opening;
a drive system coupled to the at least one bale forming drive; and a controller coupled to the drive system and the sensor, the controller configured to provide a control signal to the drive system based on a signal from the sensor to set a rotational speed of the at least one bale forming belt based on the sensed amount of crop material upstream of the inlet opening.

2. The bale forming control system of claim 1, wherein the sensor is coupled to a shaft coupled to a frame of the baler, the sensor configured to provide a first signal to the controller responsive to a shaft rotation to a first position.

3. The bale forming control system of claim 2, wherein the sensor is configured to provide a second signal to the controller responsive to the shaft rotation to a different position than the first position.

4. The bale forming control system of claim 3, wherein the first signal and the second signal differ in voltage.

5. The bale forming control system of claim 1, wherein the drive system comprises a motor, wherein responsive to the controller providing the control signal to the drive system, a speed of the motor is affected.

6. The bale forming control system of claim 5, wherein responsive to a change in speed of the motor, the rotational speeds of the at least one bale forming drive is changed to effect a change in bale forming chamber speed.

7. The bale forming control system of claim 1, further comprising a shaft coupled to a frame of the baler and further coupled to a sensor arm located proximal to the inlet opening of the bale forming chamber, the sensor configured to provide the signal to the controller responsive to rotation of the sensor arm.

8. The bale forming control system of claim 1, further comprising a conveyor assembly coupled to the front of the baler, the conveyor assembly comprising the sensor.

9. The bale forming control system of claim 1, further comprising a pickup and a windguard coupled to a conveyor assembly, the conveyor assembly coupled to the front of the baler, the sensor configured to sense the rotation of the windguard.

10. The bale forming control system of claim 1, further comprising a pickup and a windguard coupled to and proximal to the baler, the sensor configured to sense the rotation of the windguard.

11. The bale forming control system of claim 1, further comprising a towing vehicle for towing the baler, wherein the sensor comprises an acoustic sensor, the acoustic sensor mounted to the towing vehicle or the baler.

12. A bale forming control method, comprising:
causing motion of at least one bale forming belt driven by at least one bale forming drive of a bale forming chamber of a baler;
sensing an amount of a crop material before the crop material enters the bale forming chamber; and
responsive to the sensed amount, adjusting a speed of the at least one bale forming belt forming a bale from the crop material in the bale forming chamber.

13. The method of claim 12, wherein sensing the amount comprises sensing a height of the crop material.

14. The method of claim 12, wherein sensing the amount is based on sensing a shaft rotation or a sensor arm rotation, the shaft and the sensor arm disposed upstream of an inlet opening of the bale forming chamber.

15. The method of claim 12, wherein sensing the amount is based on sensing the amount acoustically prior to the crop material reaching an inlet opening of the bale forming chamber.

16. The method of claim 12, wherein sensing the amount comprises sensing the amount at a conveyor portion of a conveyor assembly coupled to the baler, at a towing vehicle that tows the baler, or at a location proximal to an inlet opening of the baler, or any combination thereof.

17. The method of claim 12, wherein adjusting the speed of forming the bale comprises adjusting the speed of the at least one bale forming drives, the bale forming drives contacting the bale directly, coupled at least in part to a bale forming member or bale forming members that contact the bale directly, or a combination of both.

18. The method of claim 17, wherein adjusting the speed of at least one bale forming drive is based on adjusting a motor speed of at least one motor coupled to the at least one bale forming drive.

19. The method of claim 12, further comprising forming the bale according to the adjusted speed.

20. A bale forming control system, comprising:
a baler comprising a bale forming chamber, the bale forming chamber comprising at least one bale forming belt and at least one bale forming drive configured to rotate the at least one bale forming belt;
a sensor positioned upstream of an inlet opening of the bale forming chamber, the sensor configured to sense an amount of crop material upstream of the inlet opening;
a drive system comprising a motor coupled to the at least one bale forming drive, the motor configured to drive the at least one bale forming drive; and
a controller coupled to the motor and the sensor, the controller configured to adjust a rotational speed of the at least one bale forming drive based on a signal from the sensor to set a rotational speed of the at least one bale forming belt based on the sensed amount of crop material upstream of the inlet opening.

* * * * *